(12) United States Patent
Vierich et al.

(10) Patent No.: US 7,865,465 B2
(45) Date of Patent: Jan. 4, 2011

(54) CONTROLLING MODEL EDITING AND MERGING

(75) Inventors: Ralf Vierich, Kanata (CA); Boris Dachevski, Ottowa (CA); Mohsen Rais-Ghasem, Ottowa (CA)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/858,175

(22) Filed: Sep. 20, 2007

(65) Prior Publication Data

US 2008/0104140 A1    May 1, 2008

(30) Foreign Application Priority Data

Oct. 27, 2006   (CA)   ................................... 2565847

(51) Int. Cl.
*G06F 17/07* (2006.01)
(52) U.S. Cl. ........................ 707/615; 707/609; 707/610; 707/613; 707/648
(58) Field of Classification Search ................. 707/601, 707/610, 620
See application file for complete search history.

(56) References Cited

U.S. PATENT DOCUMENTS

| | | | |
|---|---|---|---|
| 6,023,684 A | 2/2000 | Pearson | |
| 6,237,018 B1 | 5/2001 | Chessell | |
| 6,505,200 B1 | 1/2003 | Ims et al. | |
| 6,546,437 B1 | 4/2003 | Grimsrud | |
| 6,950,848 B1 | 9/2005 | Yousefi-zadeh | |
| 6,952,708 B2 | 10/2005 | Thomas et al. | |
| 7,028,306 B2 * | 4/2006 | Boloker et al. | 719/310 |
| 7,054,910 B1 | 5/2006 | Nordin et al. | |
| 7,136,881 B2 | 11/2006 | Gehman et al. | |
| 2002/0169775 A1 | 11/2002 | Meng | |
| 2002/0178223 A1 * | 11/2002 | Bushkin | 709/205 |
| 2003/0046266 A1 * | 3/2003 | Mullins et al. | 707/1 |

(Continued)

FOREIGN PATENT DOCUMENTS

JP    2001282594    10/2001

OTHER PUBLICATIONS

Frolund, Svend et al., "Implementing e-Transactions with Asynchronous Replication", Dependable Systems and Networks, 2000, Proceedings International Conference on New York, New York, Jun. 25, 2000, pp. 449-458.

(Continued)

*Primary Examiner*—Charles Kim
*Assistant Examiner*—Sheryl Holland
(74) *Attorney, Agent, or Firm*—Stephen R Tkacs; Stephen J. Walder, Jr.; Erin C. Ming

(57) ABSTRACT

A model edit control system controls editing of a data model. A model repository manager allows multiple users to copy a stored model stored in a repository for executing changes on multiple model copies in parallel. An action log manager crates a model action log for the stored model and tracks actions executed on the stored model. The action log manager also creates a current action log for each model copy to record actions executed on the model copy. A model merger manager merges the model copies into the stored model in the repository, by playing the actions in the current action log against the stored model in the repository.

21 Claims, 9 Drawing Sheets

U.S. PATENT DOCUMENTS

| | | | |
|---|---|---|---|
| 2003/0154191 A1* | 8/2003 | Fish et al. | 707/2 |
| 2003/0212578 A1* | 11/2003 | Link et al. | 705/2 |
| 2004/0153445 A1* | 8/2004 | Horvitz et al. | 707/3 |
| 2006/0026006 A1 | 2/2006 | Hindle | |
| 2006/0173906 A1* | 8/2006 | Chu et al. | 707/102 |
| 2009/0118845 A1* | 5/2009 | Eldridge et al. | 700/86 |

OTHER PUBLICATIONS

Vogler, Hartmut et al., "The Transaction Internet Protocol in Practice: Reliability for WWW Applications", Internet Workshop, 1999, IWS 99, Piscataway, New Jersey, Feb. 18, 1999, pp. 189-194.

USPTO U.S. Appl. No. 10/537,213, Image File Wrapper printed on Aug. 12, 2010, 3 pages.

* cited by examiner

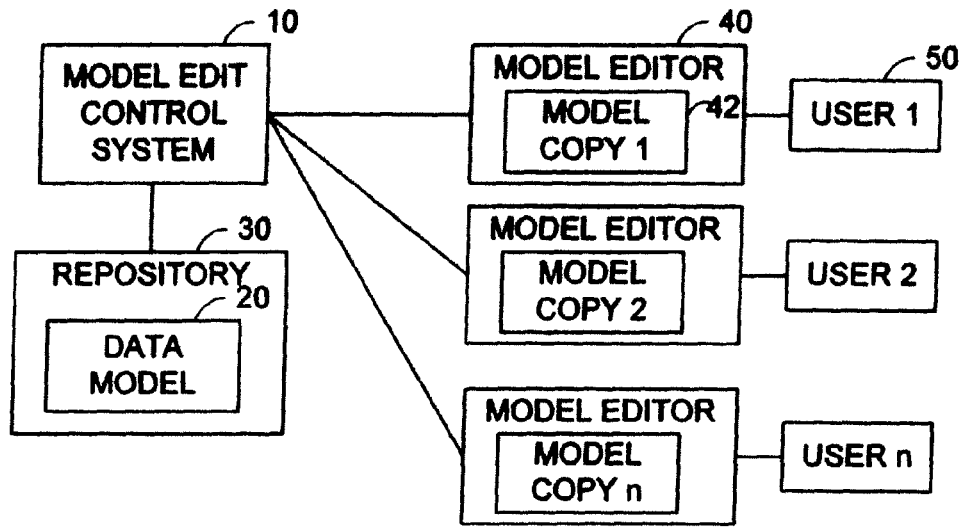
Figure 1
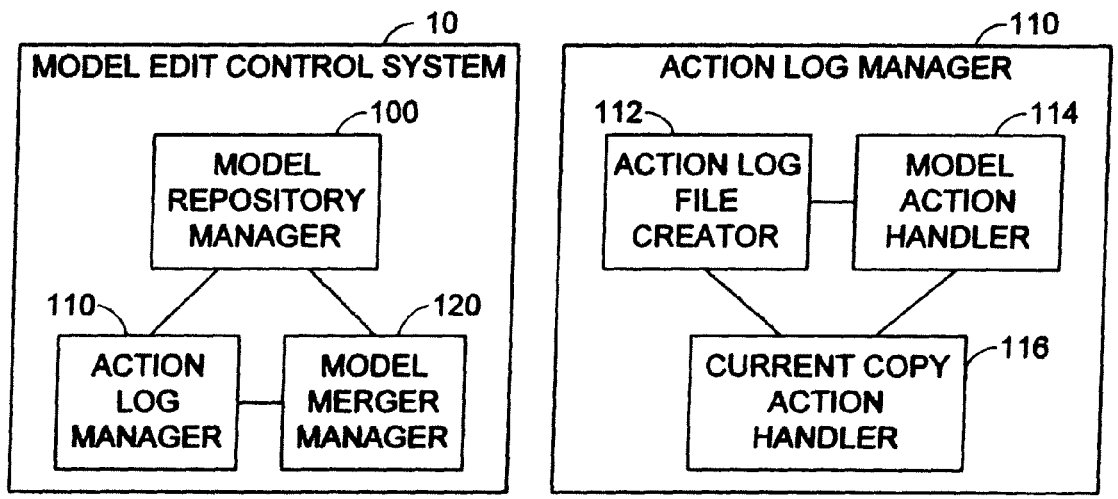
Figure 2
Figure 3

CONTROLLING MODEL EDITING AND MERGING

FIELD

The present disclosed embodiments relate to a system and method for controlling a data model, and especially for a system and method for controlling editing and merging OF a data model.

BACKGROUND

When a data model is edited, it is often preferable that multiple users or model authors can work on the model in parallel. To provide an ability for several users to work on the same model, a modeling system needs to support modeling concurrency or modelers collaboration. It is also preferable that the modeling system can track the changes made on the model.

There exist various document management systems that allow multiple users to edit a single document, and merge edited documents into a single document. Those documents are typically simple and have no specific structure to be maintained.

A data model has a specific structure or schema. If multiple users modify the model and attempt to merge the modified models, the merged model needs to maintain the specific structure. It also needs to be able to deal with conflicts where one modeler changes conflict or overlap with another modeler's changes. These requirements complicate the merging techniques for data models. Merging techniques available for typical documents are not suitable for model merging.

There exists a model managing application which implements the concept of concurrency. Such a model managing application is however heavy and relies on a proprietary database which is common among the multiple users. Thus, this approach cannot be adapted to a different type of data models.

Another model managing application uses an object locking approach. Multiple editors of a model take out objects in the model exclusively and lock the objects as the objects are being edited. When one user locks or checks-out an object, the other editor of the model is not allowed to access the locked object. This means that as a model is being edited, objects are progressively checked out. Other users are only allowed to edit these objects after they have been checked in. This approach is practical only when multiple editors of a model modify different portions of the model. It also relies on objects not having interdependencies with other objects. For example, when one object is modified, it does not cause a modification of a different object.

Another model managing application divides a model into segments, and allows each user to check out each segment to work on the segment independently. This application uses a similar locking approach to the object locking approach. It assumes that changing one segment does not cause a change in a different segment. It also assumes a model can be neatly divided such that multiple modelers can work on each segment independently. Thus, in the real world, this approach is not always practical.

Either approach has limitations and does not support true multi-user modeling of the same objects in a model.

It is therefore desirable to provide a mechanism to support true multi-user modeling.

SUMMARY

In accordance with an aspect of the present invention, there is provided a model edit control system for controlling editing of a data model. The model edit control system comprises a computer and a computer readable medium storing instructions. The instructions, when executed by the computer, cause the computer to implement a model repository manager, an action log manager and a model merger manager. The model repository manager is configured to copy a stored model stored in a repository to multiple users for executing actions on multiple model copies in parallel. The action log manager is configured to create a model action log for tracking actions executed on the stored model and to create a current action log for each model copy to record actions executed on the model copy. The model merger manager is configured to merge the model copies into the stored model in the repository by playing actions in the current action log against the stored model. The model merger manager comprises an action player and a conflict handler. The action player is configure to play the executed actions in the model copies against the stored model in the repository based on the current action log of each model copy. The conflict handler is configured to handle conflict between the stored model in the repository and the model copies based on the action log of each model copy. The conflict handler comprises a conflict information handler and an option handler. The conflict information handler is configured to provide information of at least one conflict identified responsive to playing the executed actions to the user of the model copy. The option handler is configured to present options of resolving the at least one conflict and receiving a selected option.

In accordance with another aspect of the invention, there is provided a method of controlling editing of a data model. The method comprises copying a stored model stored in a repository to multiple users for executing actions on multiple model copies in parallel; creating a current action log for each model copy; recording actions executed on each model copy in its corresponding current action log; and merging the model copies into the stored model in the repository by playing the actions recorded in the current action log of each model copy against the stored model. Merging the model copies into the stored model in the repository comprises playing executed actions in the model copies against the stored model in the repository based on the action log of each model copy and handling conflict between the stored model in the repository and the model copies based on the current action log of each model copy. Handling conflict between the stored model in the repository and the model copies comprises providing information of at least one conflict identified responsive to playing the executed actions to the user of the model copy; presenting options of resolving conflict; receiving a selected option; and resolving the conflict based on the selected option.

In accordance with another aspect of the invention, there is provided a method for controlling merging of data models. The method comprises the steps of fetching a latest version of a stored model stored in a repository; obtaining a current action log which is created for a model copy of the stored model to record actions executed on the model copy; playing, against the latest version of the stored model, the actions that are recorded in the current action log; and merging the model copy into the latest version of the stored model. Merging the model copies into the stored model in the repository comprises playing executed actions in the model copies against the stored model in the repository based on the action log of each model copy and handling conflict between the stored model in the repository and the model copies based on the current action log of each model copy. Handling conflict between the stored model in the repository and the model copies comprises providing information of at least one conflict identified responsive to playing the executed actions to the user of the model copy; presenting options of resolving conflict; receiving a selected option; and resolving the conflict based on the selected option.

In accordance with another aspect of the invention, there is provided a computer readable medium storing instructions or statements for use in the execution in a computer of a method of controlling editing of a data model. The method comprises copying a stored model stored in a repository to multiple users for executing actions on multiple model copies in parallel; creating a current action log for each model copy; recording actions executed on each model copy in its corresponding current action log; and merging the model copies into the stored model in the repository by playing the actions recorded in the current action log of each model copy against the stored model. Merging the model copies into the stored model in the repository comprises playing executed actions in the model copies against the stored model in the repository based on the action log of each model copy and handling conflict between the stored model in the repository and the model copies based on the current action log of each model copy. Handling conflict between the stored model in the repository and the model copies comprises providing information of at least one conflict identified responsive to playing the executed actions to the user of the model copy; presenting options of resolving conflict; receiving a selected option; and resolving the conflict based on the selected option.

This summary of the disclosed embodiments does not necessarily describe all features of the disclosed embodiments.

BRIEF DESCRIPTION OF THE DRAWINGS

These and other features of the disclosed embodiments will become more apparent from the following description in which reference is made to the appended drawings wherein:

FIG. 1 is a block diagram showing a model edit control system in accordance with an embodiment;

FIG. 2 is a block diagram showing an embodiment of the model edit control system;

FIG. 3 is a block diagram showing an embodiment of an action log manager;

DETAILED DESCRIPTION OF PREFERRED EMBODIMENTS

Figure 4:
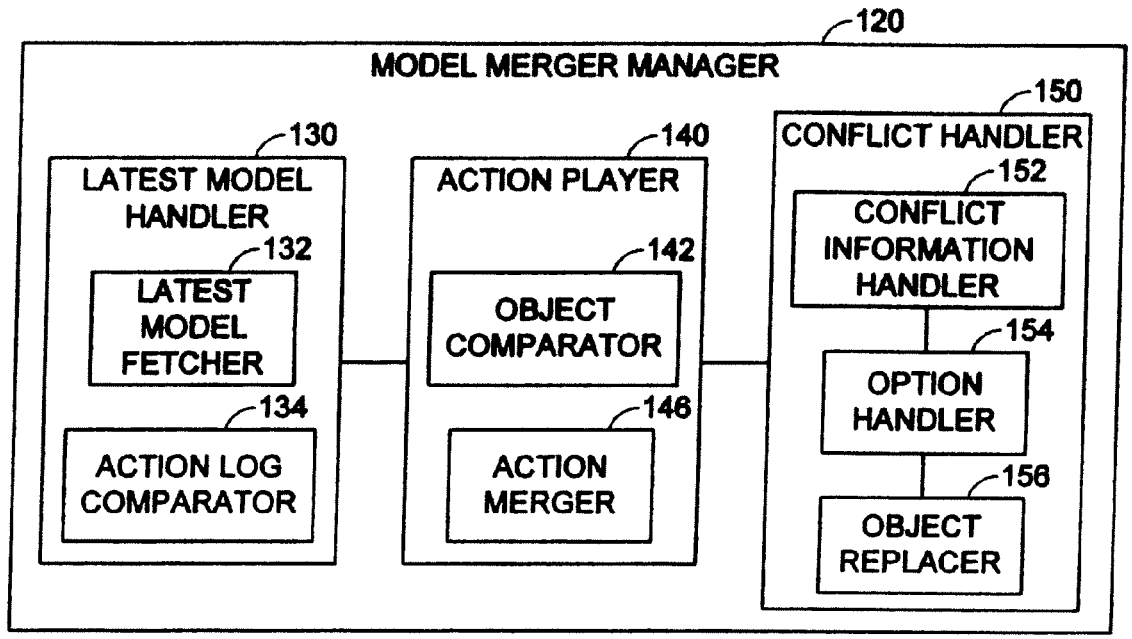
FIG. 4 is a block diagram showing an embodiment of a model merger manager.

Referring to FIG. 1, a model edit control system 10 in accordance with an embodiment is described. The model edit control system 10 controls editing of a data model 20 stored in a repository 30.

The data model 20 may be various types of data models including a metadata model. The model edit control system 10 allows multiple users or model authors 50 to edit the data model 20 in parallel. Each user 50 may edit the data model 20 through a model editor 40.

The data model 20 contains multiple objects in a specific structure or schema. The structure of the model 20 is defined by a model file. The model file is typically stored in a container, e.g., a project directory, together with other files that control other aspects of the system. A project is a directly of files representing a set of models, packages, and related information for maintaining and shaping model information. The project directory contains the model file and one or more action log files. When users merge models, the model edit control system 10 merges the model files, using the action log files, as further described below.

The model file contains one or more model documents. A model document defines one or more model objects and relationship among the model objects according to the structure of the model. The model documents are written in a standard language that can define the structure of the data model 20.

For example, a project directory may contain a model file containing an XML document that is written in eXtensible Markup Language (XML). The project directory may also contain a custom data file, a model file, a preferences file and a directory for storing action logs, e.g., customdata.xml, model.xml, preferences.xml, and logs directory. These files and document are saved as a single project in the repository 30. The logs directory contains the action logs which are used to merge changes from conflicting check-ins, as further described below.

Since the model file needs to adhere to the specific structure, merging such model files is complicated. The model edit control system 10 runs on a data model 20. During model editing, users change objects and properties of the model 20. Some of these changes trigger changes in other objects in the model 20. For example, if a user changes the name of an object, it is necessary to walk through every object in the model 20 and change properties that may reference by the name of the renamed object. Thus, in the data model 20, the action of renaming a single object may effectively modify many objects.

A document control system or repository system uses a typical merge technique for documents with no structure or simple structures. Such a document control system cannot handle complicated changes that can occur in a data model 20, i.e., changes that are triggered by a user's change. The document control system does not provide sufficient information of those changes to users. If a user attempts to use such the document control system, the user can see that there are many differences between the modified document and unmodified document. However, the user does not know why the differences have occurred. If he attempts to merge the differences by selecting one difference at a time, the user, without detailed knowledge of the data model and how the system works, can only blindly merge the changes. Thus, the resultant merged document may or may not be correct or operable. If there are conflicts when merging, the user does not have information how to resolve the conflicts for merging the documents. In contrast, the model edit control system 10 uses the recorded actions applied to the data model 20 to merge the changes from one model document to another, rather than merging documents by resolving and applying differences from one document to another. In other words, the model edit control system 10 uses the actions that created the differences to merge one model document to another, rather than using the differences of documents.

In the embodiment shown in FIG. 1, the data model 20 are maintained as simple files and merged as files, without using a document control system. In a different embodiment, the model edit control system 10 may use some functionalities of an existing document control system (not shown) that controls the repository 30. The document control system may be also called a repository system, a source control system or a document management system.

The model edit control system 10 allows for more than one users 50 to check out the model 20, make changes and check in the changes. It facilitates merging of models such that changes that one user 50 made are not over-written from changes made by a previous check-in. Thus, many users can change the same model 20 at the same time. The model edit control system 10 also provides an effect view of the changes and an ability to control potential model conflicts, as further described below.

To this end, the model edit control system 10 uses an action playing technique for merging to maintain the schema or structure of a model during the merger. As shown in FIG. 2, the model edit control system 10 has a model repository manager 100, an action log manager 110 and a model merger manager 120.

The model repository manager 100 manages check in and out of the model 20 by multiple users 50. When a user 50 checks out the model 20, the model repository manager 100 creates a copy 42 of the model 20 stored in the repository 30. A model copy 42 is created from the latest version of the model 20 at the time of the check out. Each user 50 works on each model copy 42. The model edit control system 10 allows many users to edit one or more model documents in model copies 42. The model repository manager 100 does not set an exclusive lock restriction when the model 20 is checked out by a user.

FIG. 2 shows the model repository manager 100 and action log manager 110 as elements of the model edit control system 10. In different embodiments, these elements may not be part of the model edit control system 10. For example, in an embodiment, the model edit control system 10 has the action log manager 110 and the model merger manager 120, and uses document storage control functionalities that are present in an existing document control system.

In a further different embodiment, the model edit control system 10 may work with or within a framework model system which is an action handler, i.e., a metadata application layer that handles each action to the model 20. The action handler has functionalities of the model repository manager 100 and action log manager 110. The action handler deals with the consistency checking and schema validations. When a user takes an action like 'rename', for example, the action handler renames objects and also walks through the rest of the model, fixing references from the old name to the new name. The action handler also enforces model managing rules, e.g., refusing objects that may have the same name.

The action log manager 110 manages action logs for the model 20. The action log manager 110 enables capturing, viewing, and playing back of actions performed on the model 20. An action log is a document, e.g., an XML document, that contains a set of transactions, containing one or more actions. Each transaction has a sequence number, unique ID, and one or more actions. Each action is made up of a name and input parameters. Some actions also have output parameters. When a user wants to merge models, the action player 140 of the model merger manager 120 plays back a combination of transactions, as described below.

The action log manager 110 creates an action log file for the model edit control system 10. The action log manager 110 maintains a single action log and marks in the action log file the beginning of new sessions. The action log manager 110 also marks when a file has been checked out. These transaction checkpoint are used when the model merger manager 120 tries and determines what actions are to be used for merging one model with another.

A session is the duration from when the model 20 is opened until it is closed, including check-out and check-in actions. When a model 20 is checked out of the repository 30 and a new model copy 42 is created, the action log manager 110 creates a new action log file for the new model copy 42. In a different embodiment, an action log manager 110 may create an action log file for each session, rather than using the marking of the beginning of the sessions.

As shown in FIG. 3, the action log manager 110 may have an action log file creator 112, a model action handler 114 and a current copy action handler 116.

The action log file creator 112 creates and maintains a single model action log file for each stored model 20. The model action log file may be stored in the model directory in the repository 30.

The action log file creator 112 also creates a current copy action log file for each model copy 42 created. When a user checks out the model 20, a copy of the entire project directory is created. A current copy action log file is saved in the user's copy of the project directory. The current copy action log file is merged with the model action log file in cases of certain events or operations, such as Merge, Run script or actions, Copy, Save project, Upgrade, and End session.

The model action handler 114 handles tracking of actions and events executed on the model 20 stored in the repository 30, and recording of those actions and events on the model action log file.

The current copy action handler 116 handles tracking of edit operations or actions performed by each user 50 on its associated model copy 42, and recording of those actions on its associated current copy action log file.

When a user checks out the model 20, i.e., when a new model copy 42 is created, in addition to a new current copy action log file being started, the model action handler 114 records creation of the new current copy action log file and all subsequent log files that are created until the model 20 is checked back in.

The current copy action handler 114 tracks the actions that are recorded in the action log while the model 20 is checked out.

Each action log contains the history of the changes made to its respective model or model copy in form of the transactions, as well as log records of the certain events. When a model copy 42 modified by a user is merged into the latest version of the master model 20 in the repository 30, the actions of the user recorded in the current copy action log are played against the latest version of the master model 20, and the actions played are recorded into the action log of the master model 20. Thus, the action log files are combined together, as further described below.

The format of the log record of an event may include version of the log file, user name, time stamp, operation name or annotation, and unique ID. There are times when the format of the log file may be changed. The version saved in the log file is used as a means of triggering upgrade.

Figure 15:
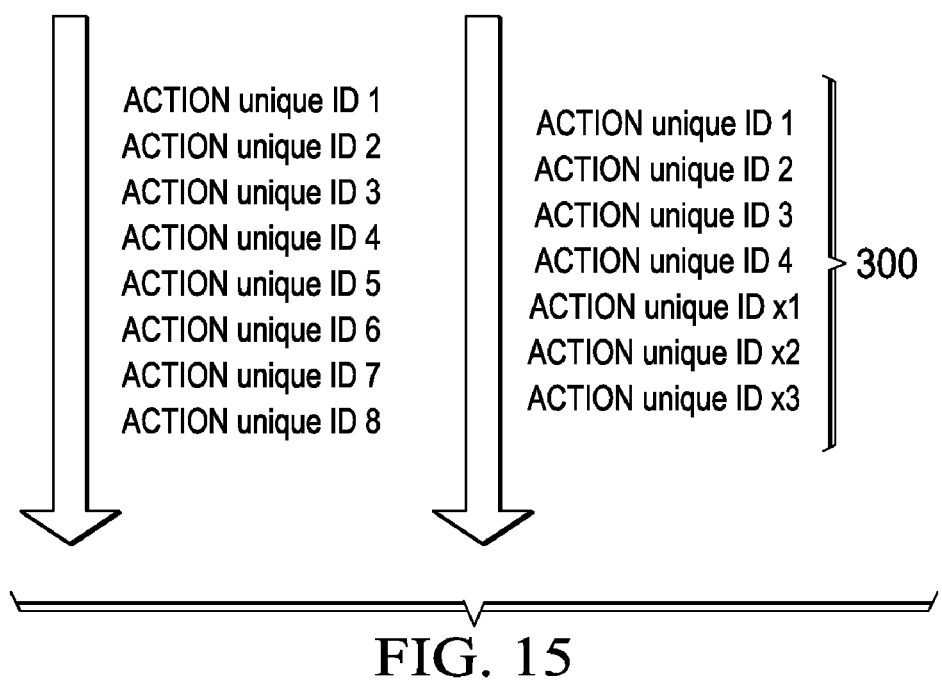
FIG. 15 is a diagram showing an example of use of unique IDs.

The unique ID may be hidden. The records of unique IDs are used to uniquely identify actions in the action log. This way when the action logs are copied as part of the branching operation, i.e., the check out operation, the system 10 has the unique IDs as a means of tracking at what point the user starts adding actions on top of the existing actions. An example is shown in FIG. 15, in which the operation is branched at point 300.

When an action log file is executed on or the merge operation is applied to the model 20, the log records from executed log file are copied into the action log file of the target model 20 or model copy 42.

Figure 10:
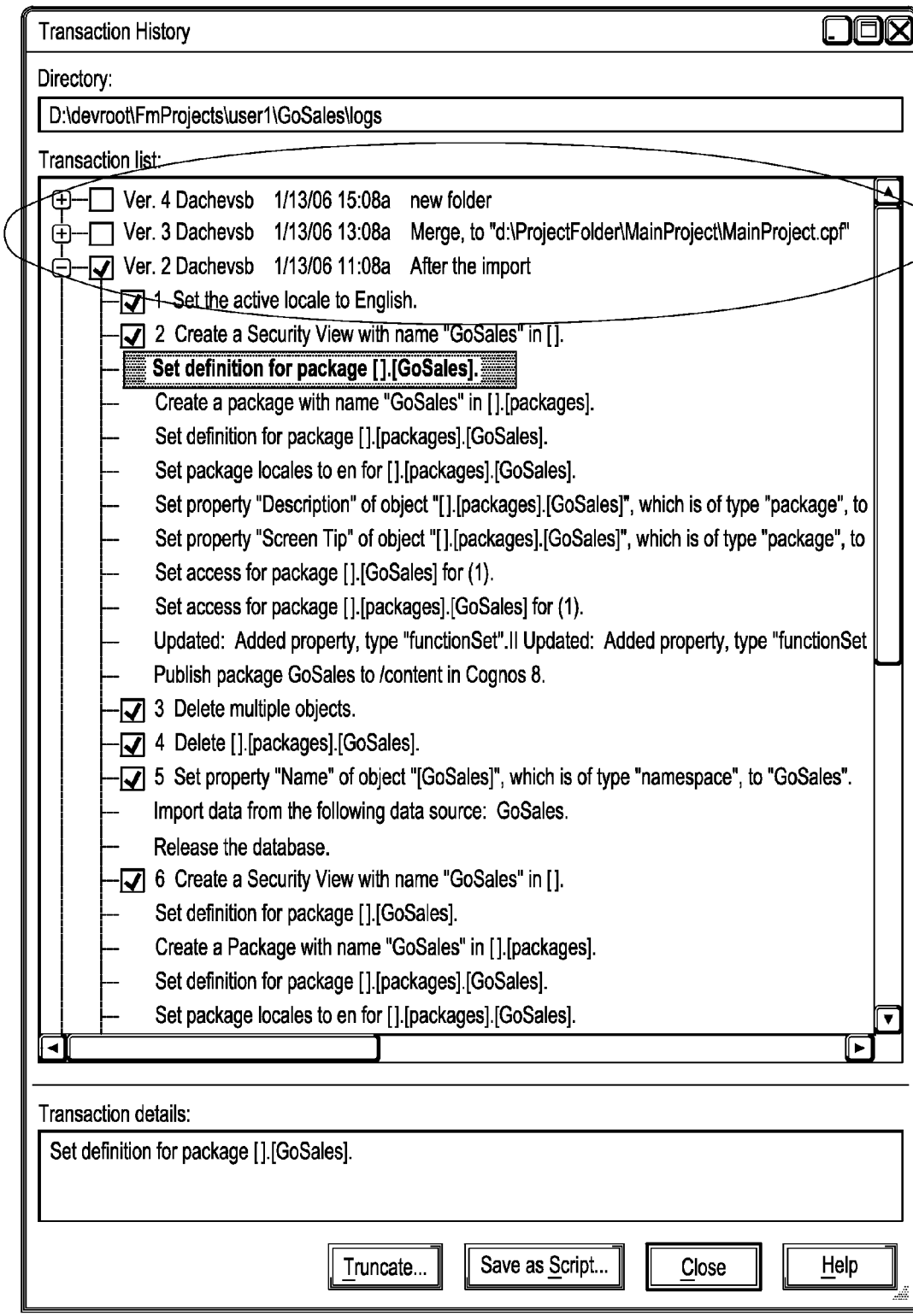
FIG. 10 is a screen shot showing an example of a transaction history.

The action log manager 110 may also provide a transaction history dialog to users to display log events and associated transactions executed to the model 20. FIG. 10 shows an example of a transaction history dialog. The records of the save event, which are used for the merge operation, may not be displayed in the transaction history dialog. The action log manager 110 may provide a function to limit the length on the log file, by reducing the number of the transaction kept in the log file. The transaction history dialog may provide a truncate button to set the length.

Thus, the model merger manager 120 provides the capability of merging two models together, and allows many users to merge their contributions made on their model copies 42 into the model 20 stored in the repository 30, i.e., the single master copy of the model 20. The model merger manager 120 accomplishes merging a model copy 42 into the stored model 20 by fetching an updated or latest master copy of the model 20 from the repository 30, and running the actions that the user 50 executed on the model copy 42 during the time the user 50 has the model 20 checked out. The model merger manager 120 performs merging based on the transaction log history stored in the action logs.

As shown in FIG. 4, the model merger manager 120 may have a latest model fetcher 130, an action player 140 and a conflict handler 150.

The latest model handler 130 may have a latest model fetcher 132 and a action log comparator 134.

The latest model fetcher 132 fetches the latest version of the model 20 in the repository 30. The latest version is the same as the version that was originally copied by the user 50 if no other user has checked in after the user 50 checked out the model 20. The action log comparator 134 checks unique IDs of actions in the action logs to determine the points where the models are branched or checked out. The latest model handler 130 fetches the latest version of the project directory from the repository, and looks at the action logs. By comparing the action logs of the latest version from the repository and the current version being edited, the latest model handler 130 can determine at what point the actions diverged.

The action player 140 plays or runs the actions of changes executed on a model copy 42 based on the action log file of the model copy 42 when the model copy 42 is being merged into the latest model 20 in the repository 30. The action playing operation includes consistency checking and schema validations by walking through the model 20. For example, when an action is renaming of an object, the action playing operation renames the object and walks through the rest of the model 20, fixing references from the old name to the new name. The action player 140 may be provided with the functionalities of consistency checking and schema validations, and play the actions by itself. In a different embodiment, the action player 140 may use those functionalities of an action handler, and plays the actions using the action handler.

In the example shown in FIG. 15, the action log on the left side is of the latest version of the model 20 fetched from the repository 30, and the action log on the right side is the current log file of a model copy 42 that a user has edited and wishes to merge with the latest model 20 in the repository 30. By comparing the actions in the action logs, the action player 140 can find that both action logs are aligned up to action with unique ID 4. At that point, the projects or models are branched. When the user proceed to merge the model copy 42 to the latest model 20, the action player 140 opens the project of the latest model 20 and plays all actions that come after action 4 against the latest model 20. Alternatively, the action player 140 may open the project of the model copy 42 and play all actions from the action log on the left side after action 4 against the model copy 42. In either case, the model merger manager 120 merges the models with the same result.

The action player 140 has an object comparator 142 and an action merger 144. The object comparator 142 compares an object that is changed in the model copy 42 with a corresponding object in the fetched latest model 20. The model merger manager 120 may have a detection mechanism to recognize an attempt to merge models with the same original source, so that the only new changes can be applied.

The model merger manager 120 is typically used to merge a model which is branched out from its master model. Thus, two models being merged together are related, and there are typically some corresponding objects existing in the models.

When the object comparator 142 does not locate a corresponding object and determines that an object is missing because it was deleted or was not in the expected location in the latest model, the object comparator 142 considers that a conflict exists and it passes the information to the conflict handler 150.

Conflicts may occur when name collisions happen and when actions are run against wrong objects. For example, in a model management system that uses a name based ID system, a user takes an action that uses the names of input objects to generate the ID (name) of an output object. If the input objects are retargeted during the merge, the output object name changes and therefore subsequent actions referencing that object will fail, which will trigger conflict handling. Also, a user takes an action that creates one or more objects where the name of the new objects conflicts with an existing name. The action is successful since the name is made unique by the model management system. The subsequent actions which were intended to be executed against the new object will be executed against the object with the original name, rather than the newly created object, which causes a conflict.

Another example of conflicts is that if an action is skipped during the merging operation, then some subsequent actions that rely on the results of the skipped action will likely fail. There is no way for the user to determine which actions are reliant on others.

In order to solve these conflicts, the model edit control system 10 keeps track of the object IDs that result in an action being executed. It may track those records either in the log file or external file. The model merger manager 120 compares the new log information to the results of the actions being played against the target model. Based on the differences of results from the action being played against the source model verses the target model, the object comparator 144 determines what object IDs are missing. This "difference" information can then be used to seed either the retarget mechanism or the UI for potential UI retargeted objects in the conflict handler 150. Further the model edit control system 10 may leverage the recorded object ID creations to use as a source to search the log file for actions that are related, i.e., actions that reference the same object.

The conflict handler 150 locates conflict between the model copy and the latest version of the model 20 in the repository based on the information from the object comparator 142. The conflict handler 150 presents or highlights located conflicts between the fetched latest model 20, i.e., the master copy, and the model copy 42 that is being merged. The conflict handler 150 allows the user to handle the conflicts.

The conflict handler 150 may have a conflict information handler 152 and an option handler 154. The conflict information handler 152 provides conflict information to users. The option handler 154 provides options to handle conflict for user's selection. The options may include to replace objects, to exclude action and to stop merging.

To allow replacement of objects, the option handler 154 may use an object replacer 156 which checks the structure of the model 20 and provides a list of objects available in the latest model 20 for replacement. The user can selects an appropriate object. The object replacer 156 replaces the object causing the conflict with the selected object.

When the user selects the exclude option, the conflict handler 150 skips the conflicted action, and processes remainder actions.

The changes are made to the model 20 as the actions are played by the action player 140. Merging is taking the actions that one modeler has made and applying them to another model.

Thus, the model edit control system 10 allows multiple changes to the same object with a means of merging and dealing with conflicts. The model edit control system 10 does not rely on a multi-user data store or other database/server type technology. It provides an ability to independently edit a copy of the model and merge change with other modelers. It may also provide an ability to annotate and track change history, and back out changes.

Figure 5:
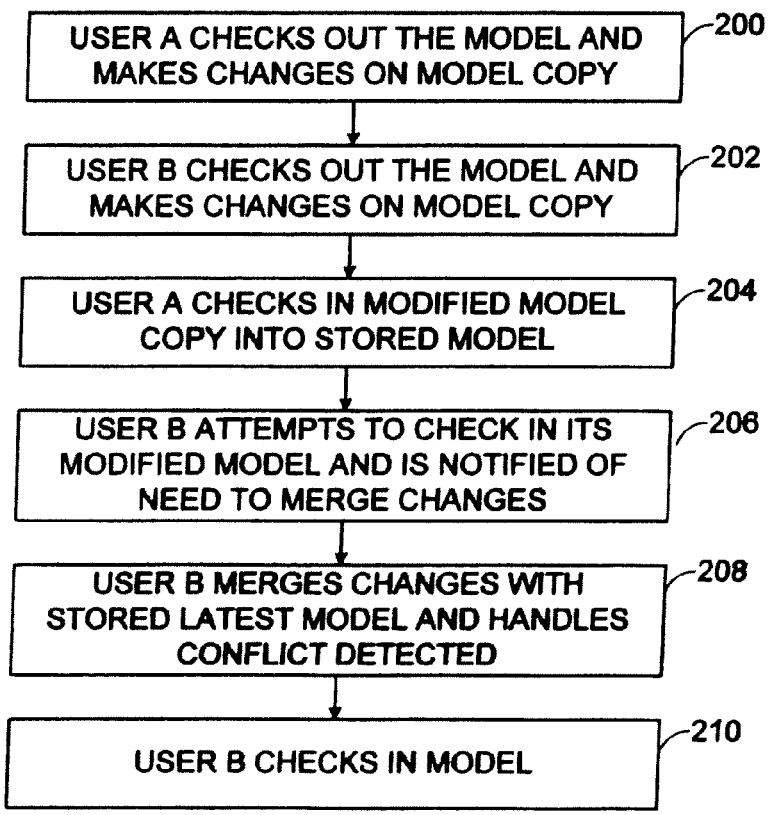
FIG. 5 is a flowchart showing an example of the general flow of the operation.

The general flow in a multi-user edit operation of a single model using the model edit control system 10 is now described referring to FIG. 5. When user A checks out the model, the model edit control system 10 creates a model copy and allows the user to make some changes on the model copy (200). Similarly, user B checks out the model and make some changes on its model copy (202). The model edit control system 10 allows user A to check in the modified model copy (204). When user B attempts to check in his modified model copy, the model edit control system 10 notifies user B that the original model from which B obtained its model copy has been changed by the version of the model checked in by user A (206). Thus, the changes that user B made need to be merged. The model edit control system 10 allows user B to merge his changes with the version of the model checked in by user A and handle any conflicts detected during the merging process (208). The model edit control system 10 then allows user B to check in the model (210).

Figure 6:
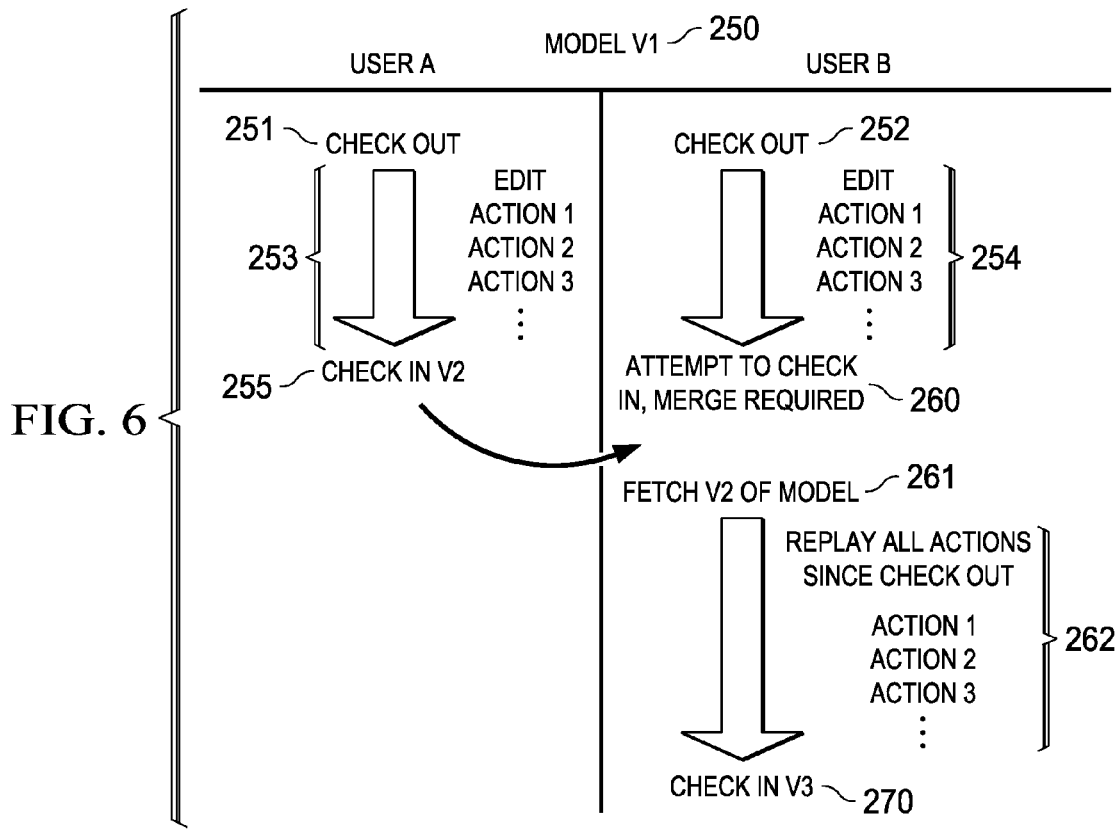
FIG. 6 is a diagram showing an example of actions by two users.

Referring to FIG. 6, the merging operation is further described using a simple user case. In FIG. 6, users A and B check out the same model 250 (251, 252). The model 250 is version V1. User A and B perform various edit operations or actions in parallel (253, 254). The model edit control system 10 records these actions in each respective action log. For example, user A renames the Country query subject to 'xxx' and deletes the 'EuroConversion' query subject. User A checks in these changes into the model 250 (255). The model 250 is now version V2.

In this example, user B does some unrelated work in the model, for example, adds some relationships to query subjects not effected by user A's changes. User B attempts to check in his changes (260). The model edit control system 10 detects that the model 250 with which user B started, i.e., version V1, is out of date. When user B goes to check-in, the model merger manager 120 detects via the source control system that another update, i.e., version V2, has been made during the time user B had the model checked out and the 'merge' is requested. User B elects to merge. In response to the merge request, the model merger manager 120 fetches the latest version V2 of the model which includes user A's changes (261). The model merger manager 120 runs or replays user B's actions against the latest version V2 of the model (262).

The model merger manager 120 presents to user B through the model editor 40 a merge dialog indicating available options. Options may include automatically merging with previous check-in, interactively merging with previous check-in, overwriting previous check-in, and/or viewing actions that user B will apply and the actions that user A has applied.

When user B selects the option to automatically merge, the model merger manager 120 checks the action log saved in the current copy action log file that represents user B's changes since the model was checked out by user B, and runs the changes against the latest version V2 of the model, which is the model checked in by user A. If no conflicts or action log errors are encountered, the model merger manager 120 asks user B if he wishes to complete the check-in. This may be done using a simple confirmation dialog. A conflict handling is described below.

When user B elects the option to manually merge his changes with the changes made by user A, the model merger manager 120 provides a merge change dialog.

Figure 7:
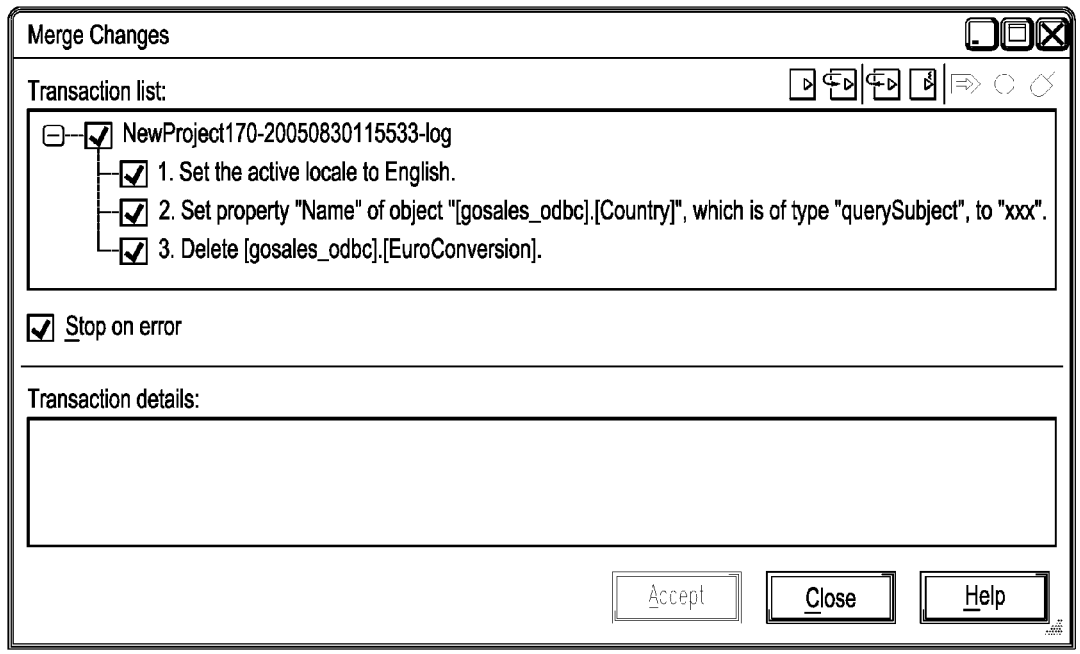
FIG. 7 is a screen shot showing an example of a transaction list.

The merge change dialog lists actions or transactions that represent the changes executed by user B on his model copy based on the current copy action log file. FIG. 7 shows an example of a merge change dialog. User B at this point can select actions or deselect some actions, and then run the script of the selected actions. Once the changes have been accepted, user B is asked if he/she wants to check in the changes that are successfully run, e.g., using the same merge change dialog shown in FIG. 7.

The changes of users A and B are now merged and user B can check in, resulting in version V3 of the model stored in the repository 30 (270).

A conflict situation where a change checked in by the first user conflicts with a proposed check-in by a second user is now described. In the above example shown in FIG. 6, a conflict occurs where user A and user B are both told that the 'EuroConversion' query subject is not required in the model 150, and both user A and user B delete the query subject (253, 254). User A is the first to check in (255). User B attempts to check in after user A (260). The model merge system 120 presents to user B a merge dialog, listing available options, as described before.

Figure 8:
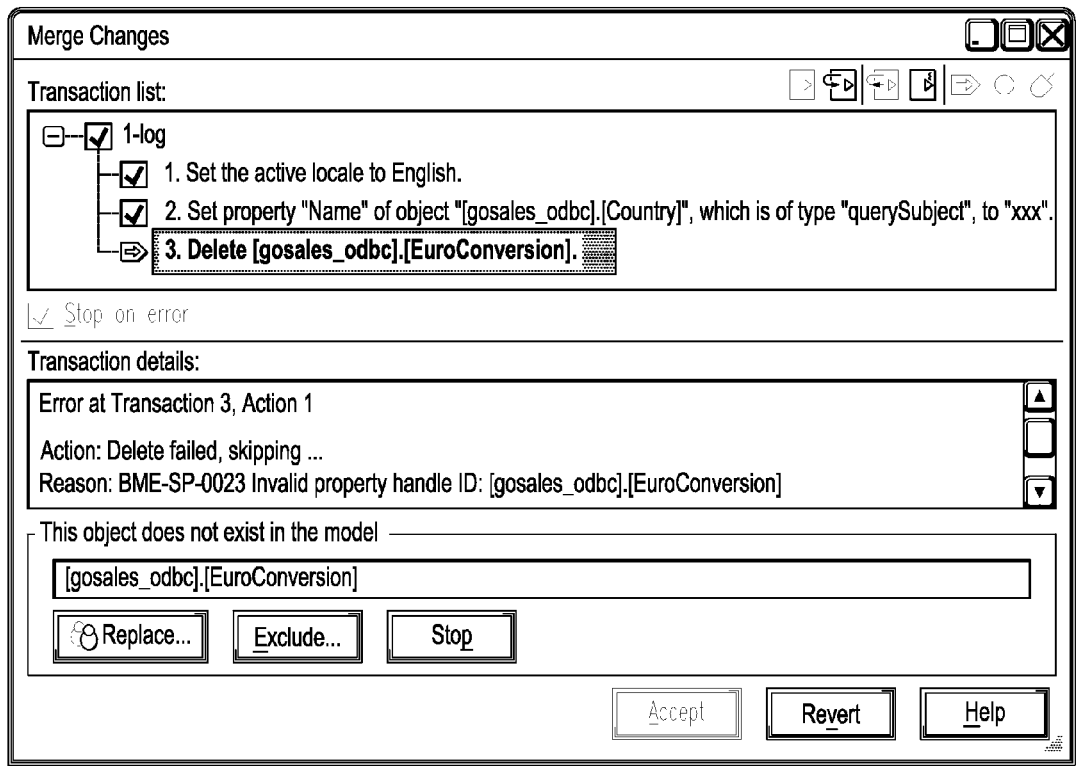
FIG. 8 is a screen shot showing an example of a merge change dialog.

When user B elects to automatically merge, the model merge manager 120 detects a conflict since both users A and B deleted the same object. From user B's perspective, he is attempting to delete a non-existent object. The model merge manager 120 gives user B at this point the option to attempt to interactively merge the changes. When user B selects to attempt interactively merge the changes, the model merger manager 120 presents a merge change dialog, indicating information of the conflict, and options available to resolve the conflict. The model merger manager 120 allows user B to select options. FIG. 8 shows an example of a merge change dialog presenting transaction details to describe the conflict error and reason, and conflict resolution options, such as to skip a duplicate to delete a conflicting action and execute the other actions, to replace a missing object with an existing object, and to stop.

Figure 9:
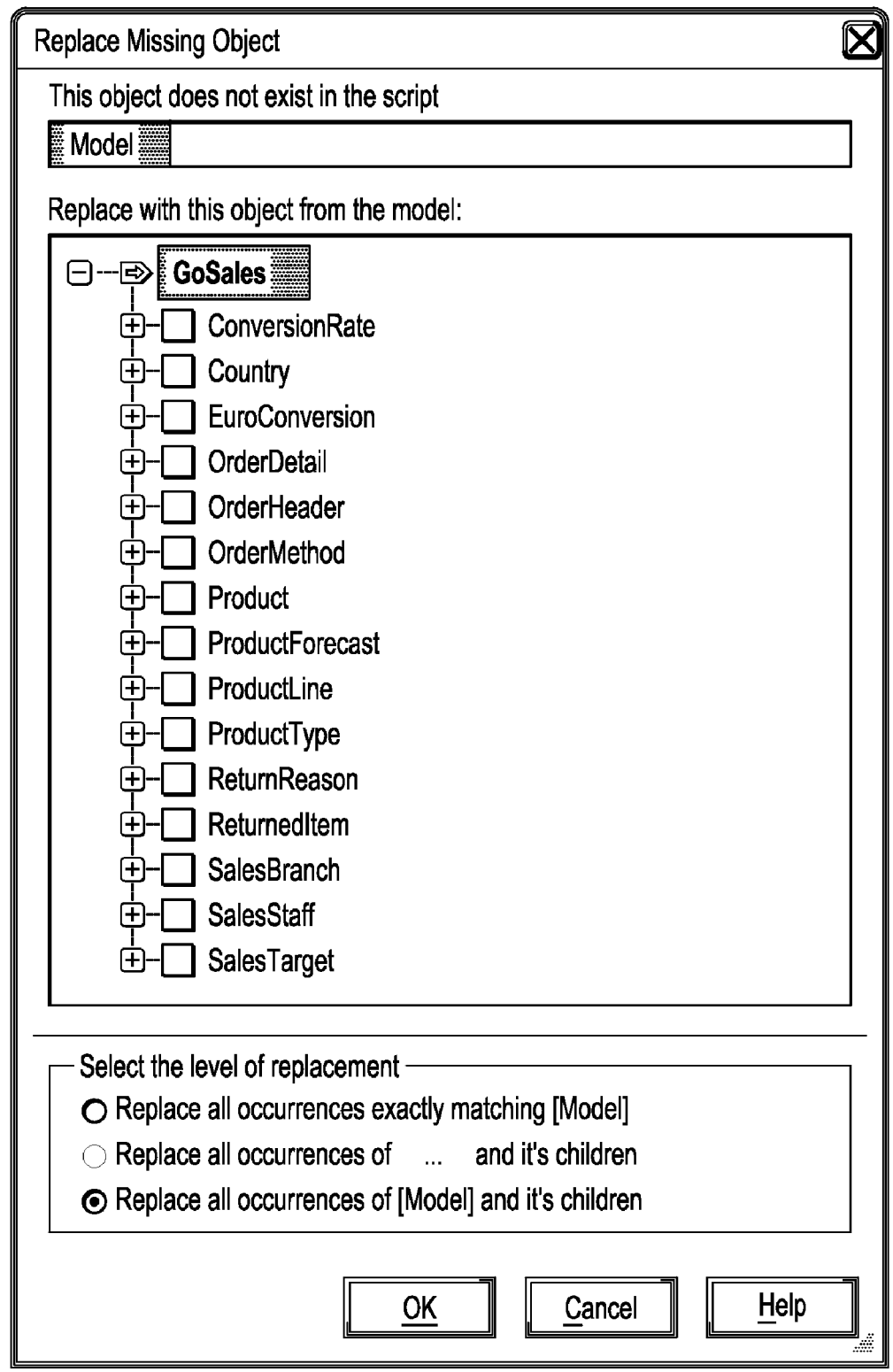
FIG. 9 is a screen shot showing an example of a replace missing object dialog.

When user B elects to replace a missing object, the model merge manager 120 presents a replace missing object dialog, such as a dialog shown in FIG. 9. User B can select a desired object to be replaced for the missing object. Also, the model merge manager 120 may provide options of the level of replacement, such as to replace all occurrences exactly matching the missing object, to replace all occurrences of an object or any of its children, and to replace all occurrences of the missing object and its children.

When user B elects to exclude, the model merge manager 120 excludes or skip the conflicting action and execute the other actions. When user B elects to stop, the model merge manager 120 stops the merging procedure.

When the user accepts the selection, the model merge manager 120 completes the merge and the check-in can continue (270).

Figure 12:
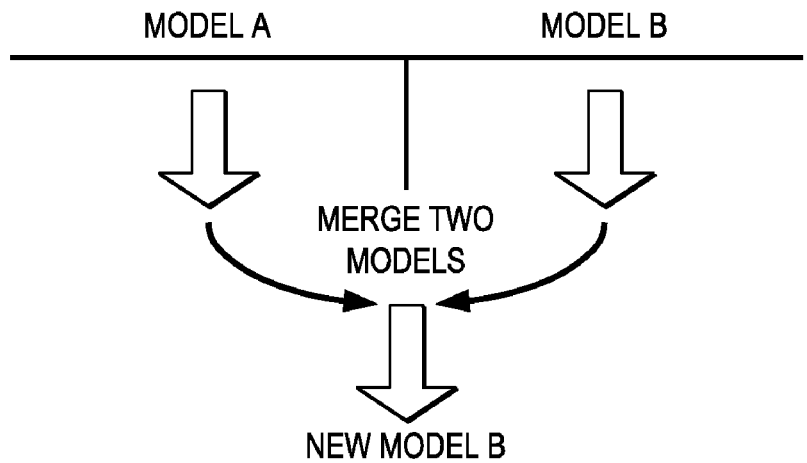
FIG. 12 is a diagram showing an example of merging two models.

In the above embodiment, a model copy 42 is merged into the stored model 20 in the repository. The model edit control system 10 may allow users to merge two or more models using the above model merger manager 120, as illustrated in FIG. 12.

The merging rules of two models by the model merge manager 120 are now described. If there is no mach in the transaction history of the two models, the model merge manager 120 merges the two models together. The outcome is the operation that depends on completeness of the action logs and their successful execution of actions against the resultant model. The model merge manager 120 allow the user making the merge to integrate his changes into the main model.

Figure 11:
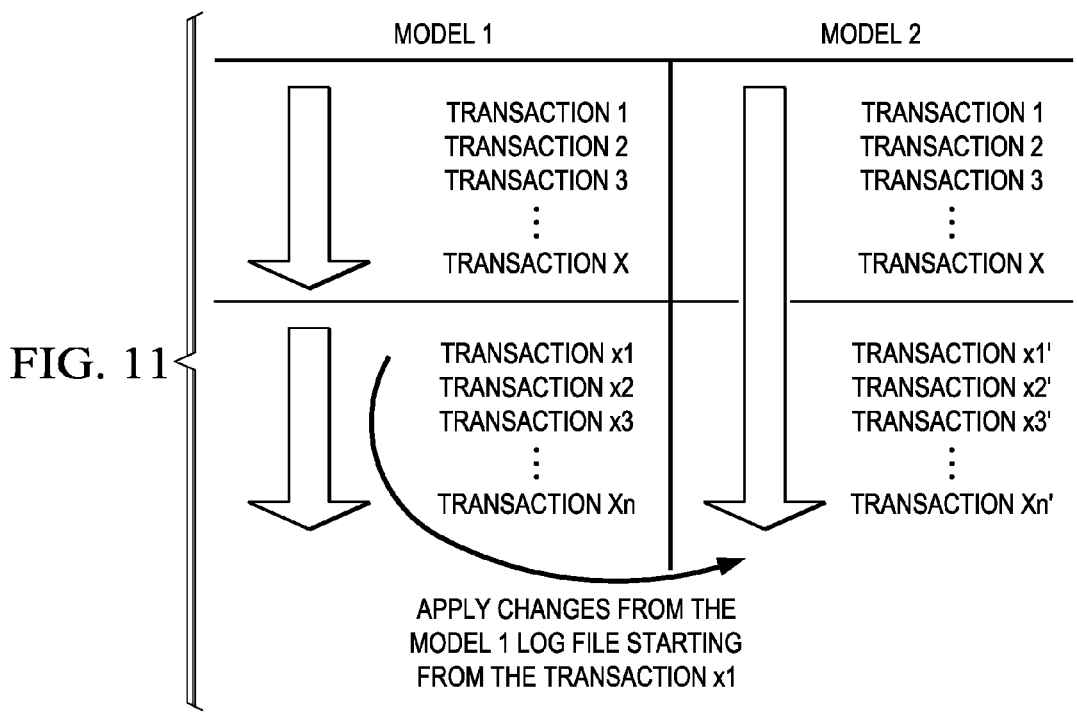
FIG. 11 is a diagram showing an example of transaction in two models.

The merge may be carried out for certain event's transactions, as exemplified in FIG. 11. Event's unique IDs are used as labels to identify the starting point of events where the logs are different.

Figure 13:
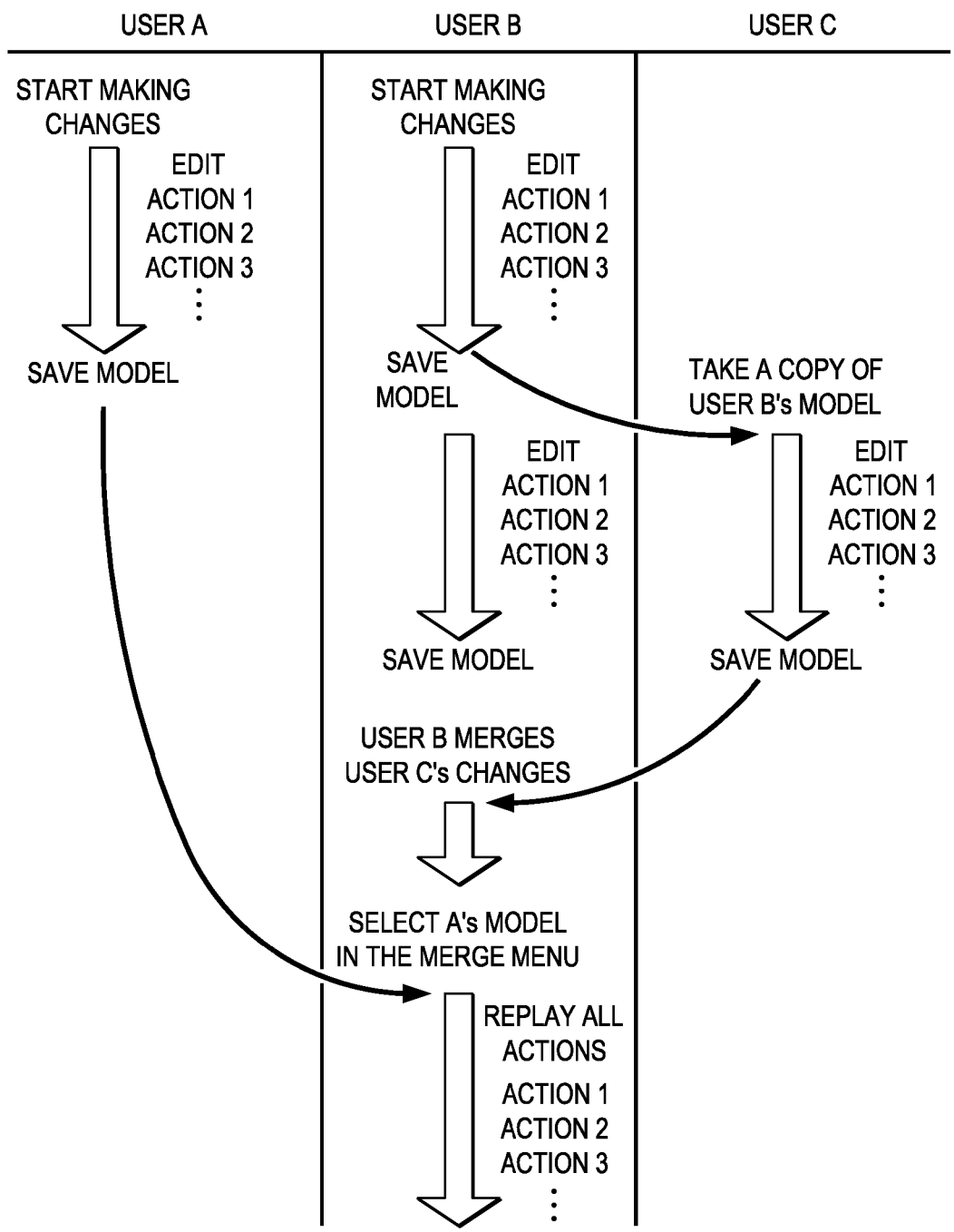
FIG. 13 is a diagram showing an example of actions by three users.

FIG. 13 shows an example of merging of models when three users are involved. Users A and B copy the same model and make changes on each model copy. User B saves its changes into the source model. Then, user C copies the model as merged with the changes saved by user B. Both users B and C make changes on each model copy. User C saves its changes. User A also saves its changes. When user B attempts to save its changes, the model edit control system notifies the user B of the change in the source model, and allows the user to merge its changes with the source model with the changes user C saved. Now user C selects user A's model in the Merge menu provided by the model edit control system. The model edit control system reply as the actions executed by user A against user B's model, and allows user B to resolve any conflict to complete a resultant model.

Figure 14:
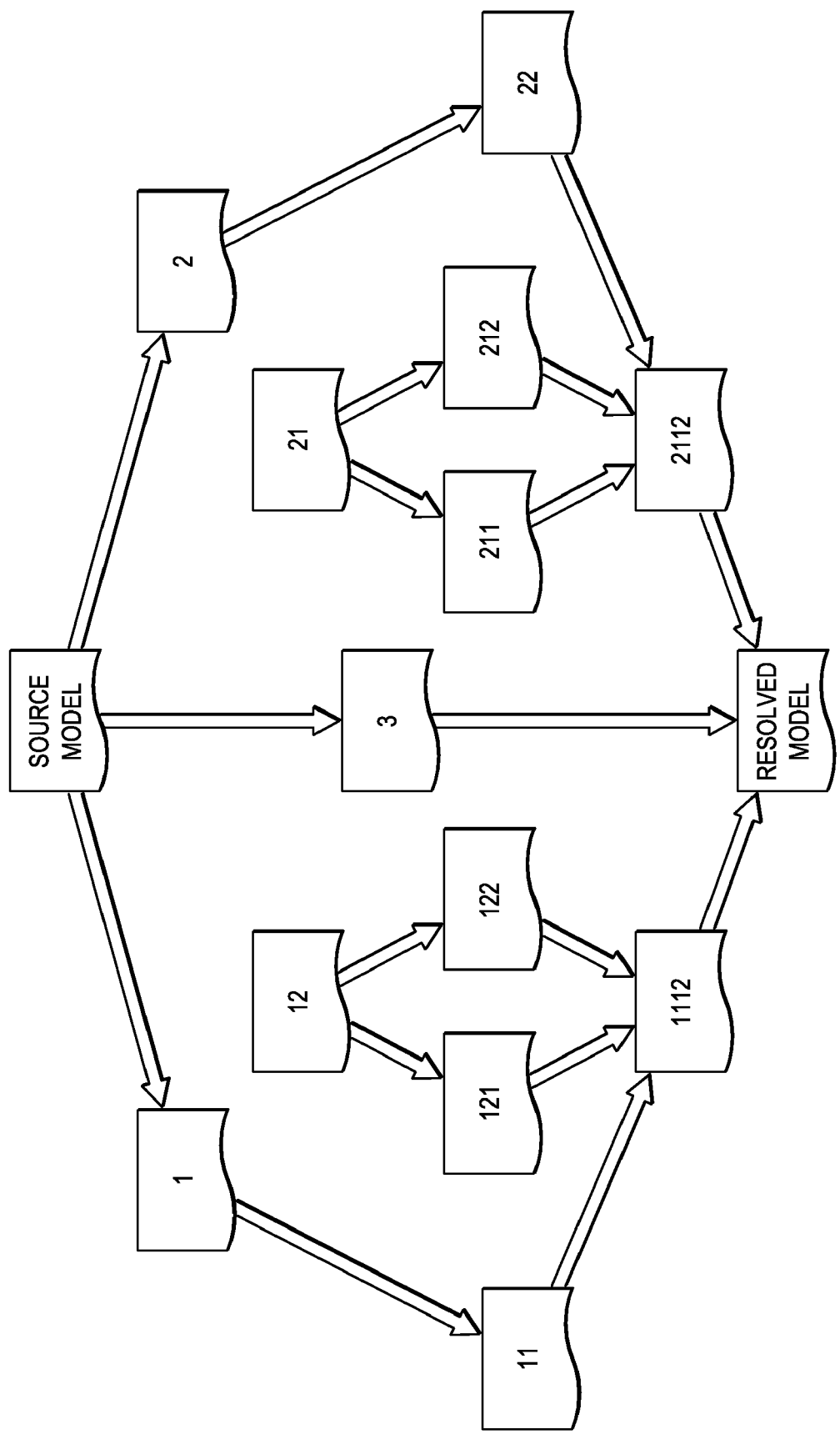
FIG. 14 is a diagram showing an example of merging multiple models.

FIG. 14 shows another example of merging models modified by multiple users using the model edit control system.

The model edit control system of the disclosed embodiments may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the disclosed embodiments, as well as the hardware, software and the combination thereof.

While particular embodiments of the disclosed embodiments have been shown and described, changes and modifications may be made to such embodiments without departing from the scope of the disclosed embodiments. For example, the elements of the model edit control system are described separately, however, two or more elements may be provided as a single element, or one or more elements may be shared with other components in one or more computer systems.

The invention claimed is:

1. A model edit control system for controlling editing of a data model, the model edit control system comprising:
   a computer; and
   a computer readable medium storing instructions, wherein the instructions, when executed by the computer, cause the computer to implement;
   a model repository manager, wherein the model repository manager is configured to copy a stored model stored in a repository to multiple users for executing actions on multiple model copies in parallel;
   an action log manager, wherein the action log manager is configured to create a model action log for tracking actions executed on the stored model and to create a current action log for each model copy to record actions executed on the model copy; and
   a model merger manager, wherein the model merger manager is configured to merge the model copies into the stored model in the repository by playing actions in the current action log against the stored model, wherein the model merger manager comprises:
      an action player, wherein the action player is configured to play the executed actions in the model copies against the stored model in the repository based on the current action log of each model copy; and
      a conflict handler, wherein the conflict handler is configured to handle conflict between the stored model in the repository and the model copies based on the action log of each model copy, wherein the conflict handler comprises:
         a conflict information handler, wherein the conflict information handler is configured to provide information of at least one conflict identified responsive to playing the executed actions to the user of the model copy; and
         an option handler, wherein the option handler is configured to present options of resolving the at least one conflict and receiving a selected option.

2. The model edit control system as claimed in claim 1, wherein the stored model is defined by a model file in a standard mark up language.

3. The model edit control system as claimed in claim 1, wherein the model merger manager merges into the stored model a model copy at a time, and merges a subsequent model copy into the stored model as merged with any preceding model copy based on the current action log for each model copy.

4. The model edit control system as claimed in claim 1, wherein the action player comprises:
   an object handler, wherein the object handler is configured to compare each object to be merged in the model copy with objects in the stored model and identify any object to be merged and missing from the stored model.

5. The model edit control system as claimed in claim 1, wherein the conflict handler comprises:
   an object replacer, wherein the object replacer is configured to present a list of objects for user's selection to replace with an object to be merged and missing from the stored model.

6. The model edit control system as claimed in claim 1, wherein the action player comprises:
an action merger, wherein the action merger is configured to merge actions played and accepted into the stored model.

7. The model edit control system as claimed in claim 1, wherein the model merger manager further comprises:
a latest model handler, wherein the latest model handler is configured to fetch a latest stored model for playing the actions in the current action log against the latest stored model.

8. The model edit control system as claimed in claim 7, wherein the latest model handler comprises:
a latest model fetcher, wherein the latest model fetcher is configured to fetch a latest version of the stored model for the action player; and
an action log comparator, wherein the action log comparator is configured to compare the actions on the model action log and the actions on the current action log to determine which actions to be played against the latest version of the stored model.

9. The model edit control system as claimed in claim 1, wherein the action log manager comprises:
a log file creator, wherein the log file creator is configured to create a model log file for the stored model and a current copy log file when a model copy is created;
a model log file handler, wherein the model log file hander is configured to track and record, in the model log file, actions executed on the stored model; and
a current copy log file handler, wherein the current copy log file hander is configured to track and record, in the current log file, actions executed on its corresponding model copy.

10. The model edit control system as claimed in claim 9, wherein the model log file handler records each action with a unique identification.

11. The model edit control system as claimed in claim 9, wherein the action log manager provides history information of the stored model based on the model log file.

12. A method of controlling editing of a data model, the method comprising:
copying a stored model stored in a repository to multiple users for executing actions on multiple model copies in parallel;
creating a current action log for each model copy;
recording actions executed on each model copy in its corresponding current action log; and
merging the model copies into the stored model in the repository by playing the actions recorded in the current action log of each model copy against the stored model, wherein merging the model copies into the stored model in the repository comprises:
playing executed actions in the model copies against the stored model in the repository based on the action log of each model copy; and
handling conflict between the stored model in the repository and the model copies based on the current action log of each model copy, wherein handling conflict between the stored model in the repository and the model copies comprises:
providing information of at least one conflict identified responsive to playing the executed actions to the user of the model copy;
presenting options of resolving conflict;
receiving a selected option; and
resolving the conflict based on the selected option.

13. The method as claimed in claim 12, wherein merging the model copies into the stored model in the repository comprises maintaining a structure of the stored model during merging of the model copies into the stored model.

14. The method as claimed in claim 12, wherein merging the model copies into the stored model in the repository comprises merging into the stored model a model copy at a time and merging a subsequent model copy into the stored model as merged with any preceding model copy.

15. The method as claimed in claim 12, wherein playing executed actions in the model copies against the stored model in the repository comprises:
identifying any object that is subject to an action in the current action log of a model copy and is missing from the stored model;
presenting a list of objects for user's selection to replace with an object to be merged and missing from the stored model; and
replacing any identified object that is subject to an action in the current action log of a model copy and is missing from the stored model with an object selected by the user.

16. The method as claimed in claim 12, wherein merging the model copies into the stored model in the repository comprises:
fetching a latest version of the stored model for playing the actions in the current action log against the latest version of the stored model.

17. The method as claimed in claim 12 further comprising:
creating a model action log for the stored model; and
tracking and recording, in the model action log, actions executed on the stored model.

18. The method as claimed in claim 17 further comprising:
comparing actions recorded in the model action log and the actions recorded in the current action log; and
determining which actions in the current action log are to be played against the stored model.

19. A method for controlling merging of data models, the method comprising:
fetching a latest version of a stored model stored in a repository;
obtaining a current action log which is created for a model copy of the stored model to record actions executed on the model copy;
playing against the latest version of the stored model, the actions that are recorded in the current action log; and
merging the model copy into the latest version of the stored model, wherein merging the model copies into the stored model in the repository comprises:
playing the executed actions in the model copies against the stored model in the repository based on the action log of each model copy; and
handling conflict between the stored model in the repository and the model copies based on the current action log of each model copy, wherein handling conflict between the stored model in the repository and the model copies comprises:
providing information of conflict located during the action playing to the user of the model copy;
presenting options of resolving conflict;
receiving a selected option; and
resolving the conflict based on the selected option.

20. The method as claimed in claim 19 further comprising:
obtaining a model action log which is created for the stored model to record actions executed on the stored model;
comparing the actions recorded in the current action tog with the actions recorded in the model action log; and determining which actions in the current action log to be played against the latest version of the stored model.

21. A computer readable medium storing instructions or statements for use in the execution in a computer of a method of controlling editing of a data model, the method comprising:

copying a stored model stored in a repository to multiple users for executing actions on multiple model copies in parallel;

creating a current action log for each model copy;

recording actions executed on each model copy in its corresponding current action log; and merging the model copies into the stored model in the repository by playing the actions recorded in the current action log of each model copy against the stored model, wherein merging the model copies into the stored model in the repository comprises:

playing the executed actions in the model copies against the stored model in the repository based on the action log of each model copy; and handling conflict between the stored model in the repository and the model copies based on the current action log of each model copy, wherein handling conflict between the stored model in the repository and the model copies comprises:

providing information of conflict located during the action playing to the user of the model copy;

presenting options of resolving conflict;

receiving a selected option; and resolving the conflict based on the selected option.

* * * * *